Sept. 15, 1953 W. E. KOCK 2,652,493
UNIPOLARIZED WAVE REFRACTOR
Original Filed May 16, 1947 2 Sheets-Sheet 1

FRONT VIEW OF LENS 130

INVENTOR
W. E. KOCK
BY
H. O. Wright
ATTORNEY

Sept. 15, 1953         W. E. KOCK         2,652,493
UNIPOLARIZED WAVE REFRACTOR
Original Filed May 16, 1947         2 Sheets-Sheet 2
*FIG. 3*
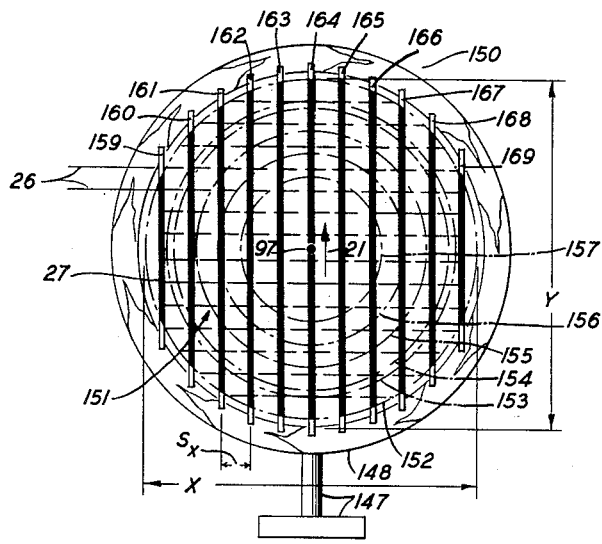
*FIG. 4*
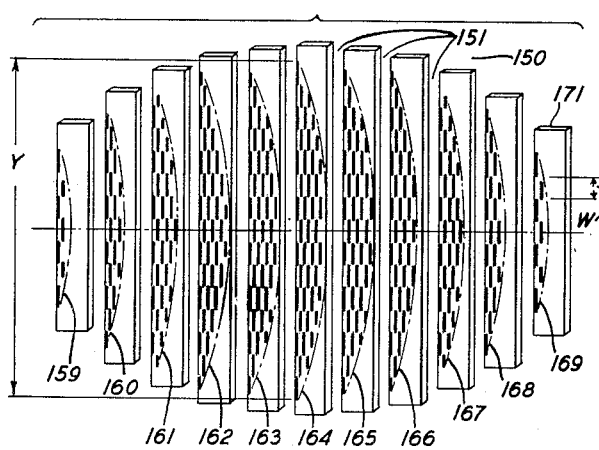
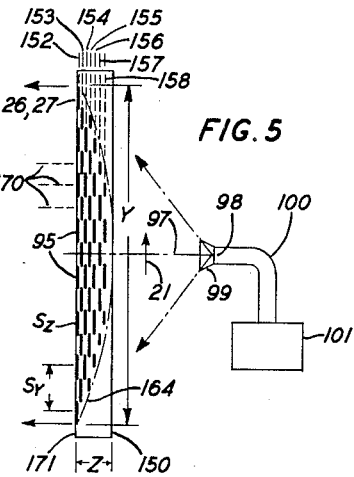
*FIG. 5*
INVENTOR
W. E. KOCK
BY
H. O. Wright
ATTORNEY Patented Sept. 15, 1953

2,652,493

UNITED STATES PATENT OFFICE 2,652,493

UNIPOLARIZED WAVE REFRACTOR

Winston E. Kock, Basking Ridge, N. J., assignor to Bell Telephone Laboratories, Incorporated, New York, N. Y., a corporation of New York Original application May 16, 1947, Serial No. 748,448, now Patent No. 2,577,619, dated December 4, 1951. Divided and this application May 10, 1951, Serial No. 225,547

11 Claims. (Cl. 250—33.63)

This invention relates to unipolarized wave refractors for changing the phase velocity of high frequency wave energy.

This application is a division of my copending application Serial No. 748,448, filed May 16, 1947 which matured as United States Patent 2,577,619 granted December 4, 1951.

A principal object of the invention is to provide refractors for changing the phase velocity of high frequency wave energy which will have substantially increased effective indices of refraction.

Other and further objects will become apparent during the course of the following description of preferred illustrative embodiments of the invention and from the appended claims.

The principles of the invention will be more readily understood in connection with the following detailed description of the illustrative embodiments illustrated in the accompanying drawings in which:

Fig. 3 shows a front view of a second specific embodiment of a refracting structure of the invention;

Fig. 4 shows, in an expanded perspective view, the individual component vertical arrays, in the direction of wave propagation, of grids or rods which, when assembled as shown in Fig. 3, form the second preferred form of refractor of the invention; and Fig. 5 is a side view of a centrally positioned component vertical array of the device of Fig. 3, shown together with appropriate transceiving means.

Figure 1:
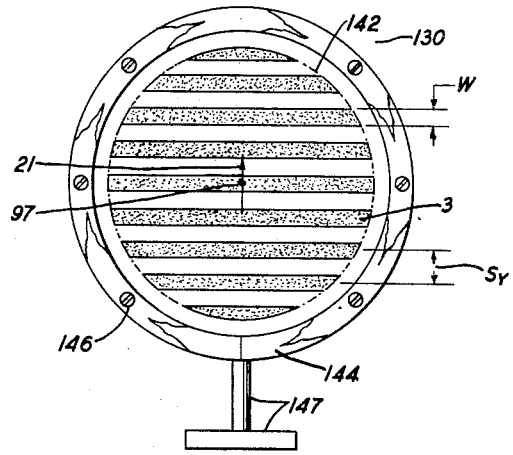
Fig. 1 shows a front view of one preferred specific embodiment of a structure of the invention.
Figure 2:
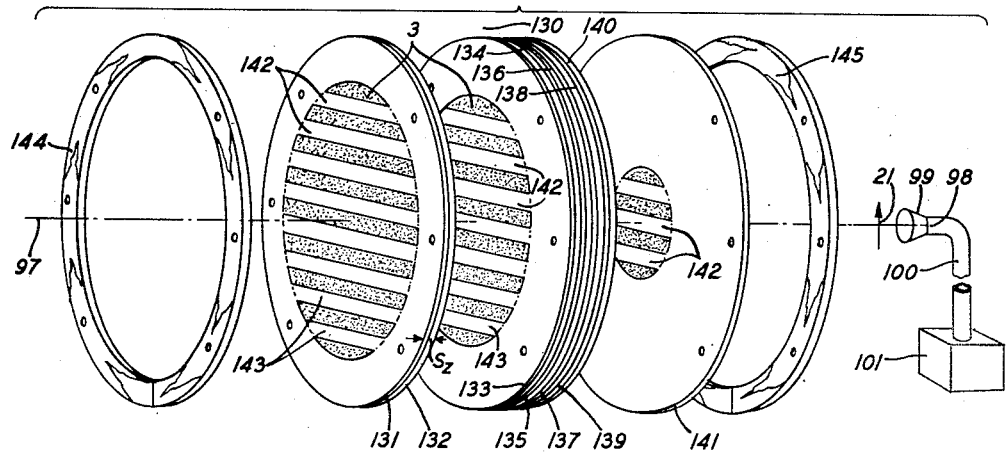
Fig. 2 shows, in a partially expanded perspective view, the form of refractor of Fig. 1 together with associated transceiving means.

In more detail in Figs. 1 and 2, reference numeral 130 denotes a unipolarized, circularly symmetrical, plano-convex, strip lens of simple lightweight construction. The lens 130 comprises six cellophane panel sheets 131, 133, 135, 137, 139 and 141, and five solid dielectric, cellophane or polystyrene foam, spacer sheets 132, 134, 136, 138 and 140, a spacer sheet being positioned between adjacent panel sheets as shown. Each panel sheet contains a circular lens panel 142 comprising a plurality of conductive tin foil strips 3 fastened to the front surface of the panel sheet. The lens panels have graded diameters, and hence different pluralities of strips. The lengths and arrangement of the strips is such that the outermost surfaces of the outermost strips and the ends of all the strips lie in and define the contour of a predetermined conventional shape of wave refractor, such as, for the present example, that of a plano-convex lens.

As in the grid prism of Fig. 10 of my above-mentioned copending parent application, the corresponding strips in adjacent panels are not aligned, but are staggered. Thus, the eight strips 3 of panel sheet 133 are staggered relative to the nine strips 3 of panel sheet 131, and are therefore opposite the eight spaces 143 of panel sheet 131. Also, the lens axis 97 passes through the central strip 3 of panel sheet 131 and the through spacing 143 between the two central strips 3 on panel sheet 133. The panel and spacer sheets are held together by means of the wooden ring 144, the wooden ring 145 and the bolt-and-nut assemblies 146; and the lens is supported by the stand 147. As in the structures described in my above-mentioned copending parent application, the refractive index $n$ is greater than unity for waves having the E-vector 21 and is dependent upon the values selected for the factors W and N, where W is the vertical width of each strip and N is the number of strips per unit area in a vertical cross-section of the lens taken through its center in the direction of propagation. The lens 130 has, as indicated in Fig. 2, a point focus 98 and its convex face is toward the horn 99.

The operation of the system 130, 99, Fig. 2, is the same as that of the system 70, 99 of Fig. 11 of my above-mentioned copending parent application. Thus, for waves electrically polarized parallel to the strip width W, as indicated by vector 21, the lens focuses the waves in all planes containing the optical axis 97 and the system 130, 99 of Fig. 2 has a point-beam characteristic.

Referring to Figs. 3, 4 and 5, reference numeral 150 denotes a unipolarized, circularly symmetrical, plano-convex grid lens of simple lightweight construction. The lens 150 comprises an array 151 of "horizontal grid members" 26, each horizontal grid member comprising a plurality of vertical metallic rod elements 27. The rods 27 are spaced, along the X dimension of the lens, a distance $S_x$ smaller than a half wavelength apart and have lengths corresponding to the desired grid width W. The grids 26 are arranged in seven circular vertical panels 152, 153, 154, 155, 156, 157 and 158 extending parallel to the XY plane. The panels 152 to 158 have graded diameters, and the component rods 27 are disposed and arranged so that the outermost surfaces of the outermost rods lie in and define the contour of a predetermined conventional shape of wave refractor, such as, for the present example, that of a plano-convex lens.

Alternatively, the structure of Figs. 3, 4 and 5 can be considered as one in which the rod elements 26 are arranged in eleven plano-convex vertical curtains 159 to 169, extending parallel to the YZ plane. In the YZ plane the rod elements 26 of each curtain are staggered in the direction of wave propagation, as shown, so that rods of each vertical row are, horizontally, opposite spaces of the next adjacent row or rows.

The rods are arranged in a maximum number of fifteen horizontal tiers 170, as indicated in Figs. 3 to 5, inclusive. More specifically, panels 152, 153, 154, 155, 156, 157 and 158 have, respectively, eight, seven, six, seven, six, five and two tiers, the rods in adjacent tiers or in adjacent panels in the direction of wave propagation being staggered, as described above.

The rods 27 are mounted in vertical polystyrene foam slabs 17, one for each of curtains 159, to 169, as shown in the expanded perspective view of Fig. 4, and the slabs extend parallel to the YZ plane and are, of course, spaced the same horizontal distance $S_x$, apart, as are the rods.

The $S_y$ and $S_z$ spacings of the grids 26 are each smaller than a wavelength and, as in the structures of Figs. 3 and 5 of my above-mentioned copending parent application, preferably less than a half wavelength.

The slabs 171 are held in position by tightly fitting slots in the single wooden ring 148.

As before, the refractive index $n$ of the lens 150 is greater than unity for waves having the vertical E-vector 21, and is dependent upon the values selected for W and N, where W is the vertical dimension of the grid arrays 26 and N is the number of arrays per unit area in a vertical cross-section of the lens taken through its center in the direction of propagation. The lens 150 has a point focus 98 and is unipolarized; and its convex face is toward the horn 99.

The operation of a system such as is indicated by the showing of Fig. 5, comprising the lens 150 and the horn 99, is the same, for waves having the E-vector 21, as that of the system 130, 99, Fig. 2. As regards the H-vector components, if any, these components pass through the grid lens 150, Fig. 3, whereas they are reflected by the lens 130.

If desired, matching sections of tapered dielectric constant may be utilized on each face of the lenses 130 and 150 in order to minimize the reflection losses, if any.

The type of construction utilized in the strip lens 130, Fig. 1 and the grid lens 150, Fig. 3, permits a relatively very close spacing $S_z$ (in the direction of propagation). By reason of the close spacing, and also by virtue of the staggered arrangement, a high effective dielectric constant, and therefore a high delay, are obtainable.

The measured effective dielectric constants of a strip array and a grid array, constructed in accordance with Figs. 1 and 3, respectively, were 225 and 20, respectively.

The strip type refractor, one form of which is illustrated by Figs. 1 and 2 and which in the form shown has a dielectric constant of 225, is especially suitable for use in a traveling wave tube since the corresponding refractive index is 15. A tube filled with this type of refractive structure would have a phase velocity $v$ of $v_0/15$, that is, 1/15 the velocity of the same waves if propagated in free space.

Staggering of the strips, or grids, as taught above, increases the refractive index since it increases the lengths of the shortest paths by which the wave energy can pass through the assembly. Obviously, therefore, a still greater increase in refractive index would result if the strips or grids were made somewhat wider in the vertical direction than the spaces between consecutive strips or grids in the same XY plane layer of the lens. Also, obviously, other arrangements of staggering consecutive XY plane panels of strips or grids can readily be devised which will result in longer minimum wave energy paths and hence, larger effective refractive indices for the over-all assembly.

Numerous and varied other arrangements clearly within the spirit and scope of the invention will readily occur to those skilled in the art. The above-described arrangements are merely illustrative and by no means exhaustively cover the applications of the principles of the invention as disclosed.

What is claimed is:

1. A passive refractor for retarding linearly polarized electromagnetic waves within a predetermined range of frequencies and having predetermined directions of polarization and propagation, said refractor having a principal axis and a first and a second minor axes, each of said three axes being perpendicular to the other two, said refractor comprising a plurality of plane panels arranged along said principal axis, said panels being perpendicular to said principal axis and parallel to each other, each of said panels comprising a plurality of parallel portions, each of said portions having a substantially uniform width parallel to said first minor axis which is less than one-half wavelength of the highest frequency to be employed, a substantially uniform length parallel to said second minor axis which is large with respect to said width, and a substantially uniform thickness parallel to said principal axis which is small with respect to said width, alternate ones of said plurality of parallel portions of each said panel having substantially identical width dimensions and including sufficient electrically conductive metal in a solid state to totally reflect linearly polarized, electromagnetic waves within said frequency range having a direction of polarization parallel to said first minor axis, the portions intermediate said alternate portions of said plurality of parallel portions of each said panel having substantially identical width dimensions and being of dielectric material substantially freely passing linearly polarized electromagnetic waves within said frequency range having a direction of polarization parallel to said first minor axis, adjacent successive panels along said principal axis having the reflecting portions of one panel in alignment with the non-reflecting portions of the other in the direction parallel to said principal axis, whereby said refractor will have a large refractive index for said linearly polarized electromagnetic waves propagated through said refractor when said principal axis is parallel to said predetermined direction of propagation of said waves and said first minor axis is parallel to said predetermined direction of polarization.

2. The refractor of claim 1, in which said reflecting portions include continuous strips of electrically conductive metal in a solid state coextensive with said portions.

3. The refractor of claim 1, in which said reflecting portions include wires of electrically conductive metal parallel to said first minor axis, extending across the width of said portions and uniformly spaced, in the direction of said second minor axis, less than one-half wavelength apart of the highest frequency to be employed.

4. The refractor of claim 1, in which the spacing between each two successive adjacent panels in the direction of said principal axis is less than one-quarter wavelength of the highest frequency to be employed.

5. The refractor of claim 1, in which the outermost surfaces of the outermost portions of the metallic conducting elements lie in and define the contour of a simple optical refracting device.

6. The refractor of claim 5, in which the contour defined by the outermost surfaces of the outermost portions of the metallic conducting elements is that of a convex optical lens.

7. The refractor of claim 5, in which the contour defined by the outermost surfaces of the outermost portions of the metallic conducting elements is that of a plano-convex optical lens.

8. A passive refractor for retarding linearly polarized electromagnetic waves within a predetermined range of frequencies and having a predetermined directions of polarization and propagation, said refractor comprising a plurality of plane curtains, arranged parallel to each other along a common principal axis, each curtain comprising a plurality of parallel strips alternately of conductive material in a solid state and dielectric material, the widths of all said strips being substantially uniform and less than one-half wavelength of the highest frequency to be employed, the lengths of said strips being substantially uniform and large with respect to their widths, the thickness of each conductive strip being small with respect to its width, the spacing between consecutive curtains along said principal axis being slightly greater than the thickness of said conductive strips, the conductive strips of each curtain being aligned with the dielectric strips of the next preceding and succeeding curtain in the direction of said principal axis whereby the said refractor has a large index of refraction to linearly polarized electromagnetic waves within said band of frequencies having a direction of propagation parallel to said principal axis and a direction of polarization parallel to the width dimensions of said strips.

9. The refractor of claim 8, wherein each of said strips of conductive material are replaced by a grid of parallel wires extending across the width of the strip and spaced along said strip at intervals of less than one-half wavelength of the highest frequency to be transmitted.

10. The refractor of claim 9, in which the outermost surfaces of the outermost wires lie in and define the contour of a convex optical lens.

11. The refractor of claim 8, in which the outermost surfaces of the outermost conductive strips lie in and define the contour of a convex optical lens.

WINSTON E. KOCK.

References Cited in the file of this patent

UNITED STATES PATENTS

| Number | Name | Date |
|---|---|---|
| 2,064,582 | Wolff | Dec. 15, 1936 |
| 2,288,735 | O'Connell | July 7, 1942 |

OTHER REFERENCES

Electronics, March 1946, page 101.